Aug. 17, 1965  J. A. JARDIN  3,200,952
COILED FILTER HAVING UNIFORM SURFACE POROSITY
Original Filed March 25, 1960
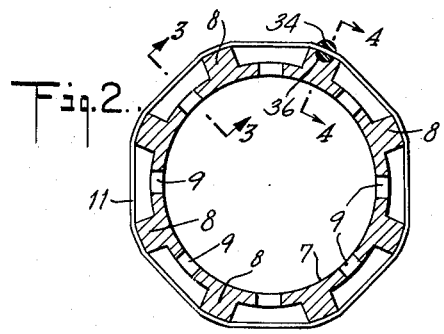
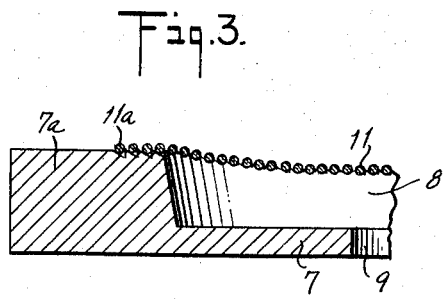
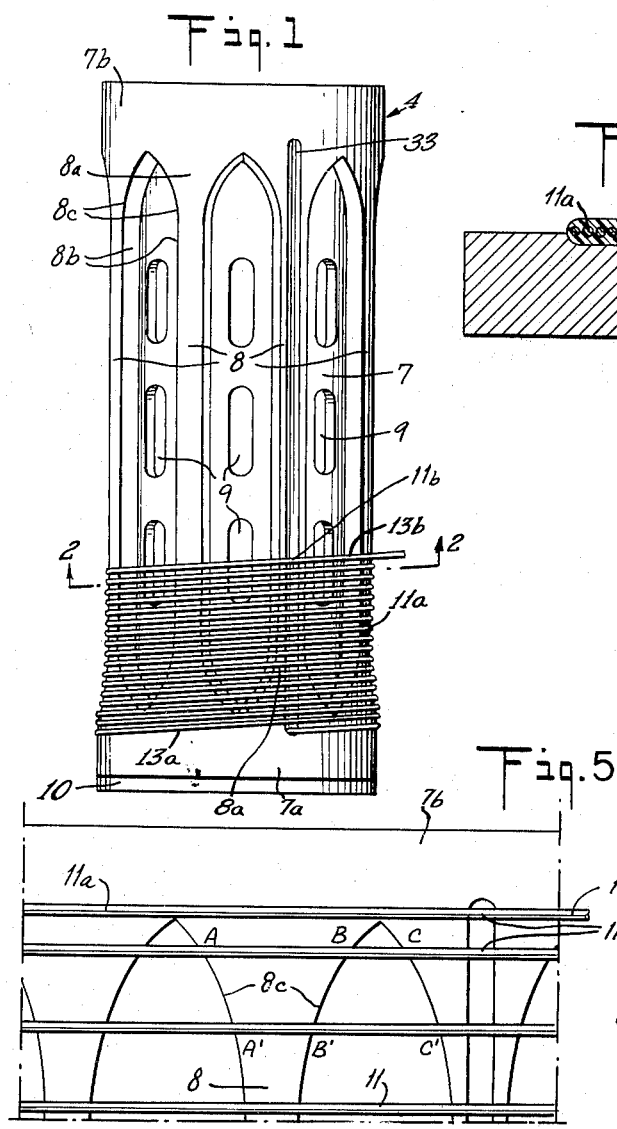
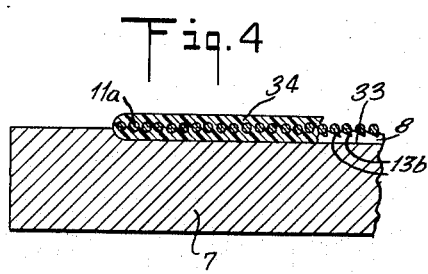
INVENTOR:
JACQUES ALPHONSE JARDIN
BY
Robert Henderson
ATTORNEY

# United States Patent Office 3,200,952
Patented Aug. 17, 1965

3,200,952
COILED FILTER HAVING UNIFORM SURFACE POROSITY
Jacques Alphonse Jardin, Paris, France, assignor to Compagnie Electro-Mecanique, Paris, France, a company of France
Original application Mar. 25, 1960, Ser. No. 17,688, now Patent No. 3,105,289, dated Oct. 1, 1963. Divided and this application June 21, 1963, Ser. No. 289,670
Claims priority, application France, Dec. 1, 1959, 811,845, Patent 1,250,592; Jan. 18, 1960, add. app. 815,938 (now add. # 77,314, Jan. 8, 1962)
2 Claims. (Cl. 210—457)

This application is a division of my copending application Serial No. 17,688, filed March 25, 1960, now Patent No. 3,105,289, dated October 1, 1963, to which reference may be made for details of means by which filters according to the present invention may be made.

This invention is concerned with improvements in or relating to coiled filters.

Filters known as "coiled" filters are currently used in order to purify liquids such as industrial oils, the filtering surface of such filters consisting of a wire which is helically wound in a helical groove on a framework which is generally cylindrical in shape. The closer the turns of the helix are together, the finer is the filter and it is obviously advantageous to be able to use wire of as small a diameter as possible in order to increase the capacity of the filter surface. Reference herein to a "helical groove" comprehends that a portion of that groove consists of helically aligned cuts or slots in parallel, wire supporting ribs of said framework.

As the turns of the wire are substantially polygonal in shape over the greater portion of the filter surface which bears against the parallel ribs and at the same time the end or terminal portions of the framework are cylindrical, difficulties are encountered in maintaining constant or uniform mesh (i.e., spacing between successive turns of the wire) where the winding passes from its polygonal shape to its cylindrical shape at the junctures of said ribs with the cylindrical terminal members of the wire-supporting framework.

According to this invention, constant or uniform mesh of the winding is maintained at the juncture of said ribs with the terminal members by forming the ribs with gradually widened ends which adjoin each other angularly at their junctures with the terminal members in the form of pointed arches. By this arrangement, the polygonal shape of the winding is so gradually transformed into cylindrical shape that there is no appreciable breach in the transformation where the ribs adjoin the terminal members. Hence, thereis no breach in the uniformity of the mesh of the winding at said junctures and no failure of uniform filtering effect at said points.

Another preferred feature of the invention consists in very simple means of fixing the wire winding to the framework. This means consists in sticking or soldering the various turns of said surface to said framework along a generatrix thereof. For this purpose, there is preferably formed along the crest of one of the ribs and over the adjacent cylindrical portions, a longitudinal groove over which pass the various turns and which is packed with a line of adhesive substance which coats the corresponding portions of the wire.

Not only does this enable the winding to be finished very simply but also, in the event of accidental breakage of the wire, only one turn is detached from the framework, whereas, if the wire were only fixed at its ends, the whole wire, the length of which is relatively great, would unwind, which might cause serious accidents.

In the drawing:
FIGURE 1 is a somewhat diagrammatic view, in elevation, of a filter cartridge of a filter according to a preferred embodiment of this invention, the illustrated turns of a wire filtering winding being shown spaced apart considerably more than would be the case in an actual filter, this being done to clarify the drawing;

FIG. 2 is a sectional view on the line 2—2 of FIG. 1;

FIG. 3 is an enlarged, fragmentary sectional view on the line 3—3 of FIG. 2;

FIG. 4 is an enlarged, fragmentary sectional view on the line 4—4 of FIG. 2;

FIG. 5 is an enlarged, fragmentary, somewhat diagrammatic, developed view of an end portion of the framework of FIG. 1 on which many turns of wire are omitted to enable the principal concept of this invention to be easily understood.

As explained in said Patent No. 3,105,289, a filter cartridge, such as cartridge 4 shown in the accompanying drawing, is rigidly suspended in a sealed manner within a cylindrical casing in such a way that liquid to be filtered is admitted into the casing, exteriorly of the cartridge. The thus admitted liquid passes through the cartridge's wire, filtering winding into the interior of the cartridge, whence the filtered liquid is carried off through suitable ducts or piping.

The filter cartridge 4 consists of a cylindrical framework 7, the outer face of which is provided with a number of longitudinal ribs 8 between which are provided a series of holes 9. The cartridge is closed by a bottom plate 10 and its open top end is sealingly fixed to a part of the filter's casing which opens into piping for carrying off the filtered liquid.

The ribs 8 carry a filter surface 11 consisting of a wire 11a which is wound in a continuous helix in which form it is retained by being seated within a helical groove 13 constituted of helical indentations 13a in the terminal members 7a and 7b and helically aligned slots 13b in the ribs 8. The ends of the helix are fixed to said cylindrical terminal members of the framework.

It will be understood that, in FIG. 1, the upper part of the helical winding of wire 11a has been omitted to permit certain parts of that figure to be more readily understood. Upper parts of helical groove 13 also have been omitted for the same reason. The reference characters 13a and 13b in FIGS. 1 and 4 indicate the location of the helical groove directly underlying the illustrated portion of the wire winding, and it will be understood that the helical groove continues upwardly into the top terminal members 7b to retain all turns of the wire winding in place throughout its entire length.

The ribs 8 are rigidly and integrally connected to cylindrical end portions 7a and 7b by progressively widening end portions 8a is such manner that their outer edges 8b converge towards one another. The converging portions may be given various shapes. In the present example, the end portions 8c of each set of two adjacent edges 8b form an ogive. However, said edges may be either curved, as illustrated, or they may be straight; in either case forming an ogive or pointed arch. As a matter of convenience, and irrespective of whether the converging portions are curved or straight, reference is sometimes hereinafter made to the ribs 8, and more particularly to the widened end portions 8a of said ribs, as "adjoining each other angularly."

Furthermore, along the crest of one of the ribs 8, which may be made a little wider than the others, there is formed a groove 33 which projects at each end over the adjacent cylindrical portions 7a and 7b.

As shown in FIG. 2, the filter surface 11 has a substantially polygonal configuration in its central portion where it rests on the ribs 8, while the wire 11a has a circular configuration where it rests on the cylindrical terminal members 7a, 7b.

The framework which has just been described overcomes the problems which arise as a result of this difference in shape in the turns in the production of the filter surface.

In applying a filtering wire winding to this framework, the winding of the wire 11a is commenced on the cylindrical terminal member 7b, the first turns, such as the turn designated by 11x in FIG. 5 having a substantially circular shape.

As the turns progress over the ogival portions 8c, they gradually change shape, their circular or arcuate portions such as AB, A', B' diminishing in length, while their rectilinear portions BC, B', C' become longer.

Thus, the passage from the substantially circular shape of the turns wound on the cylindrical member 7b to the substantially polygonal shape of the turns resting on the ribs 8 is gradually progressive and, as shown in FIG. 3, the spacing between successive turns of the wire remains constant. The same is also true, of course, for the final stage of winding where the turns similarly pass progressively from the polygonal shape to the circular shape on the member 7a.

Thus, the single, helically wound length of wire extends uninterruptedly from and upon cylindrical portion 7a to and upon cylindrical portion 7b; and the filter surface covers the whole of the apertures bounded by the ribs 8.

In addition, the present invention offers an extremely convenient means of locating the wire and fixing the filter surface to the framework.

As shown in particular in FIGS. 1 and 5, a small portion 11b of each turn passes over the longitudinal groove 33 which is formed in the framework. When the winding is completed, the ends of the wire are temporarily held fast and a quantity of an adhesive 34 (FIG. 4) sufficient to coat the portions 11b is poured into the groove 33. When the adhesive has hardened sufficiently, the ends of the wire are cut off.

According to a modification, it would also be possible to pack the groove 33, before the winding, with a substance such as tin solder and, when the wire has been wound, to heat this strip of solder, for example by means of a soldering iron, in order to melt the solder and to cause it to penetrate into the interstices between the turns of the wire.

Whatever the means used, the filter surface is soldered or otherwise stuck to the framework over a narrow strip along one generatrix.

I claim:

1. A coiled filter comprising a generally cylindrical framework having spaced, coaxial, cylindrical terminal members and a plurality of spaced, circularly arranged, parallel ribs, rigidly interconnecting said terminal members, said ribs having gradually widened ends and adjoining each other sharply-angularly at their junctures with said terminal members in the form of pointed arches, the spacing between said ribs being substantial to provide relatively wide filtering areas therebetween, the framework being formed with an external helical groove extending into said terminal members and about said ribs, and a winding of fine wire disposed under tension in said helical groove with its opposite ends extending about said terminal members; the turns of said groove being so spaced as to maintain the turns of wire therein spaced from each other to an extent less than the size of particles to be prevented from passing therebetween and being uniformly spaced from each other from an area at said gradually widened rib-ends, over the points of said arches, and into adjacent areas of said terminal members; and the wire winding being in generally polygonal form at intermediate points of said ribs and being graduated in form from said intermediate points to the points of said pointed arches, whence the winding continues into said terminal members, in cylindrical form, without interruption in the uniform spacing of the turns of wire of the winding at the points of said arches.

2. A coiled filter according to claim 1, one of said ribs being formed with an external longitudinal groove extending therealong and into said terminal members and intersecting plural convolutions of said helical groove, and the filter further comprising adhesive material in said longitudinal groove in adherent engagement with plural turns of said wire at said one rib and at said terminal members.

References Cited by the Examiner

UNITED STATES PATENTS

| | | | |
|---|---|---|---|
| 2,084,433 | 6/37 | Chorlton | 210—497.1 X |
| 2,911,100 | 11/59 | Brunsman | 210—497.1 X |

REUBEN FRIEDMAN, *Primary Examiner.*

HARRY B. THORNTON, *Examiner.*